United States Patent
Heinrich et al.

(10) Patent No.: US 10,973,729 B2
(45) Date of Patent: Apr. 13, 2021

(54) MOBILE WALKING AID

(71) Applicant: Orthoscoot GmbH, Neusäss/Vogelsang (DE)

(72) Inventors: Frank Heinrich, Augsburg (DE); Andreas Hertle, Aystetten (DE)

(73) Assignee: Orthoscoot GmbH, Neusäss/Vogelsang (DE)

( * ) Notice: Subject to any disclaimer, the term of this patent is extended or adjusted under 35 U.S.C. 154(b) by 0 days.

(21) Appl. No.: 16/477,600

(22) PCT Filed: Mar. 12, 2018

(86) PCT No.: PCT/EP2018/056065
§ 371 (c)(1),
(2) Date: Jul. 12, 2019

(87) PCT Pub. No.: WO2018/188866
PCT Pub. Date: Oct. 18, 2018

(65) Prior Publication Data
US 2019/0350797 A1    Nov. 21, 2019

(30) Foreign Application Priority Data

Apr. 10, 2017    (DE) ..................... 20 2017 102 137.8

(51) Int. Cl.
*A61H 3/04*        (2006.01)
*B62H 1/12*        (2006.01)
(Continued)

(52) U.S. Cl.
CPC ............... *A61H 3/04* (2013.01); *B62H 1/12* (2013.01); *B62K 5/003* (2013.01); *A61H 2003/005* (2013.01); *A61H 2003/046* (2013.01)

(58) Field of Classification Search
CPC ............... A61H 3/04; A61H 2003/005; A61H 2003/046; B62H 1/12; B62K 5/003
See application file for complete search history.

(56) References Cited

U.S. PATENT DOCUMENTS 5,692,779 A * 12/1997 Hedgepeth ........... B62D 63/062
                                                              280/769
6,053,189 A *  4/2000 Longenecker ........... A61H 3/04
                                                              135/67
(Continued)

FOREIGN PATENT DOCUMENTS

DE    20 2015 106423 U1    3/2017
DE    20 2015 106424 U1    3/2017
(Continued)

OTHER PUBLICATIONS

International Search Report dated Jun. 5, 2018 for PCT/EP2018/056065 filed Mar. 12, 2018.
(Continued)

*Primary Examiner* — Erez Gurari
(74) *Attorney, Agent, or Firm* — Paul D. Bianco; Gary S. Winer; Fleit Intellectual Property Law (57) ABSTRACT

A mobile walking aid includes an undercarriage, a frame and a support for a person's leg. The undercarriage comprises a two-wheeled front axle and a rear axle. The rear axle can be converted between a single-wheeled version with a first wheel, and a two-wheeled version. In order to convert from the single-wheeled version to the two-wheeled version, a conversion kit can be provided which comprises an axle extension that can be mounted on the axle of the first wheel, and a second wheel. The axle extension can be mounted, optionally, on both sides of the axle of the first wheel which is arranged laterally and centrally between the front wheels.

21 Claims, 5 Drawing Sheets

(51) Int. Cl.
B62K 5/003 (2013.01)
*A61H 3/00* (2006.01)

(56) References Cited

U.S. PATENT DOCUMENTS

| | | | | |
|---|---|---|---|---|
| 6,634,660 | B2* | 10/2003 | Miller | A61H 3/04 |
| | | | | 135/67 |
| 8,348,288 | B1* | 1/2013 | Laughon, Sr. | A61G 5/02 |
| | | | | 280/87.021 |
| 8,608,184 | B2* | 12/2013 | Janis | A61H 3/04 |
| | | | | 280/87.03 |
| 9,227,684 | B2* | 1/2016 | Smith | B62J 1/08 |
| 2001/0038186 | A1 | 11/2001 | Wychozowycz | |
| 2003/0094779 | A1* | 5/2003 | Miller | A61H 3/04 |
| | | | | 280/87.021 |
| 2005/0121873 | A1* | 6/2005 | Miller | A61H 3/04 |
| | | | | 280/87.021 |
| 2009/0058036 | A1* | 3/2009 | Hoepner | A61H 3/04 |
| | | | | 280/267 |
| 2011/0109058 | A1* | 5/2011 | Janis | A61H 3/04 |
| | | | | 280/263 |
| 2014/0097592 | A1* | 4/2014 | Smith | B62K 5/003 |
| | | | | 280/267 |
| 2015/0076780 | A1* | 3/2015 | Smith | B62K 5/023 |
| | | | | 280/87.041 |
| 2017/0143575 | A1 | 5/2017 | Heinrich et al. | |
| 2019/0350797 | A1* | 11/2019 | Heinrich | B62K 5/003 |

FOREIGN PATENT DOCUMENTS

| | | |
|---|---|---|
| GB | 108777 A | 8/1917 |
| WO | 2010/099270 A1 | 9/2010 |

OTHER PUBLICATIONS

Written Opinion for PCT/EP2018/056065 filed Mar. 12, 2018.
Result of examination report for German Application No. 20 2017 102 137.8 filed Apr. 10, 2017.
International Preliminary Report on Patentability, dated Oct. 15, 2019, with English translation of Written Opinion, for PCT/EP2018/056065 filed Mar. 12, 2018.

* cited by examiner

MOBILE WALKING AID

FIELD OF THE INVENTION

The invention concerns a mobile walking aid.

BACKGROUND OF THE INVENTION

DE 20 2015 106 423 U1 discloses a mobile walking aid which, like similar walking aids, are used to enable a person with an injured leg or foot to move without placing a load on the injured leg or foot in order to avoid compromising the healing process by such loading. Movement with such a walking aid is similar to the use of a scooter, in which the injured leg or leg whose foot is injured lies bent with the lower leg on a roughly horizontal elongated support to unload the injury, so that the walking aid takes up the body weight instead of the injured leg or foot if the injured leg or the leg with the injured foot is loaded.

The undercarriage of this known walking aid has a two-wheeled front axle, which can be steered by means of a steering arm arranged on the upper end of a handlebar, and a single-wheeled rear axle, in which the support is arranged on a frame between the two axles in a lateral central position. By means of this three-wheeled design with a single rear wheel both the support is symmetrically supported on the ground at limited overall dimensions in order to guarantee a stable riding behavior and a natural leg posture is enabled for the user without lateral spreading of the thighs, in which case the lower leg and foot of the intact leg and the rear wheel can move past each other without problem with natural leg posture.

SUMMARY OF THE INVENTION

One aspect of the invention is to further improve the functional safety of a walking aid of the known type.

Accordingly, a mobile walking aid is disclosed. Advantageous developments and refinements of the invention are also disclosed.

According to the invention, the rear axle in the mobile walking aid with an undercarriage, frame and a support for a person's leg, the undercarriage having a two-wheeled front axle and a rear axle, can be converted between a single-wheeled embodiment with a first wheel and a two-wheeled embodiment with a first wheel and a second wheel. The rear axle is stabilized as required in the lateral direction by the second wheel, and the hazard of tipping over, which is present in a three-wheeled vehicle when traveling on a curve, especially at high speed and/or to the outside of the curve in sloping ground, is prevented. The operating safety of a walking aid is thereby improved. In particular, this favors users with an impaired sense of balance, where there is already increased risk of tipping over. The walking aid can be purposefully adjusted to the requirements of the user through its convertability.

For conversion from the single-wheeled to the two-wheeled embodiment, a conversion kit can be provided, which comprises a second wheel and a common axle for both wheels that is longer than the one of the single-wheeled embodiment, the common axle being mountable on the frame in two different positions, in which the first wheel is arranged at the same location as in the single-wheeled embodiment and the second wheel is optionally arranged offset to the left or right laterally from the first wheel.

Alternatively, a conversion kit can be provided for conversion from the single-wheeled into the two-wheeled embodiment, which comprises an axle extension and a second wheel mountable on the axle of the first wheel. The cost for conversion can thereby be kept low, in which case the single-wheeled rear axle is not completely replaced for conversion but need only be expanded by adding on components. It is advantageous here if the axle extension can be mounted optionally on either side of the axle of the first wheel. Problem-free adjustment of the walking aid to the corresponding requirements of the user is thus possible. It is also advantageous if the axle extension in the mounted state extends coaxially to the axle of the first wheel. This facilitates mounting of the axle extension and makes it possible for the second wheel to have roughly the same diameter as the first wheel, so that a particularly stable riding behavior is obtained with the second wheel.

The second wheel expediently has a slightly smaller diameter than the first wheel. This is due to the fact that the single brake of the walking aid is arranged on the first wheel of the rear axle in order to prevent the hazard of tipping over forward, which would exist during braking of the wheels of the front axle. The slightly smaller diameter of the second wheel, on the one hand, guarantees continuous contact with the ground during normal riding operation of the first wheel equipped with the brake and, on the other hand, ensures that vertical loading of the first wheel is retained even in the case of ground contact of the second wheel, which is sufficient to achieve the necessary effect of the brake. For this purpose, the second wheel is preferably smaller in diameter than the first wheel by 1 cm to 3 cm. The optimal diameter difference between the two wheels of the rear axle depends on their spacing and the hardness of the tires and their deformation through the effect of the weight of the rider.

It is also advantageous if the second wheel in the two-wheeled embodiment of the rear axle has a significant spacing from the first wheel, which is at least one-sixth of the spacing between the two wheels of the front axle. In principle, the riding behavior of the walking aid in the two-wheeled embodiment of the rear axle becomes more stable as the spacing between the two wheels increases. In order to achieve the intended stabilization effect, a certain minimum spacing should not be exceeded. On the other hand, it is preferred that the second wheel in the two-wheeled embodiment of the rear axle has a spacing from the first wheel that is at most one-third of the spacing between the two wheels of the front axle. An unduly large spacing would compromise maneuverability of the walking aid, in which the risk of getting caught on obstacles would exist with the second wheel on curves in which the second wheel is situated on the inside.

It is also expedient if the second wheel can be mounted onto and demounted from the axle extension without using a tool by means of a snap-on or screw connection. A butterfly nut or wing nut can be used for this purpose. The second wheel can thereby be removed effortlessly in order to reduce the dimensions of the walking aid for transport. The user also has the option of using the walking aid, as required, as either a two-wheeled or a single-wheeled rear axle. A simple and expedient embodiment of the axle extension consists of the fact that it has a spacer sleeve that can be screwed onto the axle of the first wheel and an additional axle that can be snapped onto the spacer, on which the second wheel is mounted.

The first wheel of the rear axle both in the single-wheeled embodiment and in the two-wheeled embodiment is preferably arranged laterally in the center between the front wheels. In both embodiments of the rear axle, this is the optimal position with respect to riding stability of the walking aid, and it simplifies conversion between the single-wheeled and two-wheeled embodiment.

It is particularly advantageous with respect to braking if the rear axle is mounted to rotate on the frame and its two wheels are connected non-rotatably to each other in the two-wheeled embodiment. The brake of the first wheel thus also acts on both wheels in the two-wheeled embodiment of the rear axle, which makes it possible both in the single-wheeled embodiment and in the two-wheeled embodiment of the rear axle to provide only a single brake on the first wheel of the rear axle without adversely affecting the braking effect by an unfavorable weight distribution on the two wheels with predominant loading of the second wheel.

An advantageous realization of the combination of the rotatable mounting of the rear axle on the frame and a rotationally fixed connection of its two wheels in the two-wheeled embodiment consists of the fact that the axle of the first wheel is rotatably mounted on the frame and the first wheel is non-rotatably connected to it, and that for conversion to the two-wheeled embodiment an axle extension can be non-rotatably connected to the axle of the first wheel and the second wheel connected non-rotatably to the axle extension.

BRIEF DESCRIPTION OF THE DRAWINGS

Preferred embodiment examples of the invention are described below with reference to the drawings. In the drawings

DETAILED DESCRIPTION OF THE INVENTION

A walking aid 1 according to the invention, a first embodiment example of which can be seen in FIGS. 1 and 2 in two different perspectives, obliquely from the front and obliquely from the rear, and in FIG. 3 in a view from below, includes as main components an undercarriage 2, with a two-wheeled front axle 3, which can be steered by means of a steering arm 4 via a handlebar 5, and with a non-steerable rear axle 6, as well as a frame 7 and a support 8 fastened to frame 7 for a leg or lower leg of a person whose mobility is to be facilitated by the walking aid 1. According to the invention, the rear axle 6 can be converted between a single-wheeled and a two-wheeled embodiment, where the two-wheeled embodiment with a first wheel 9 and a second wheel 10 is shown in FIGS. 1 to 3.

Conversion to the two-wheeled embodiment occurs in this embodiment example by means of a conversion kit, whose main components are the second wheel 10 and an axle extension 11. The first wheel 9 is arranged laterally in the center on rear axle 6, whereas the second wheel 10 is offset laterally significantly relative to the first wheel 9 on the end of the axle extension 11, i.e., the lateral spacing from the first wheel 9 is a significant fraction of the spacing between the two wheels 12 and 13 of the front axle 3; in the depicted example, about one-fourth of the spacing. As also is readily apparent, especially in FIG. 3, the second wheel 10 has a somewhat smaller diameter than the first wheel 9. Both wheels 9 and 10 consist of solid rubber, just like wheels 12 and 13 of the front axle.

Figure 1:
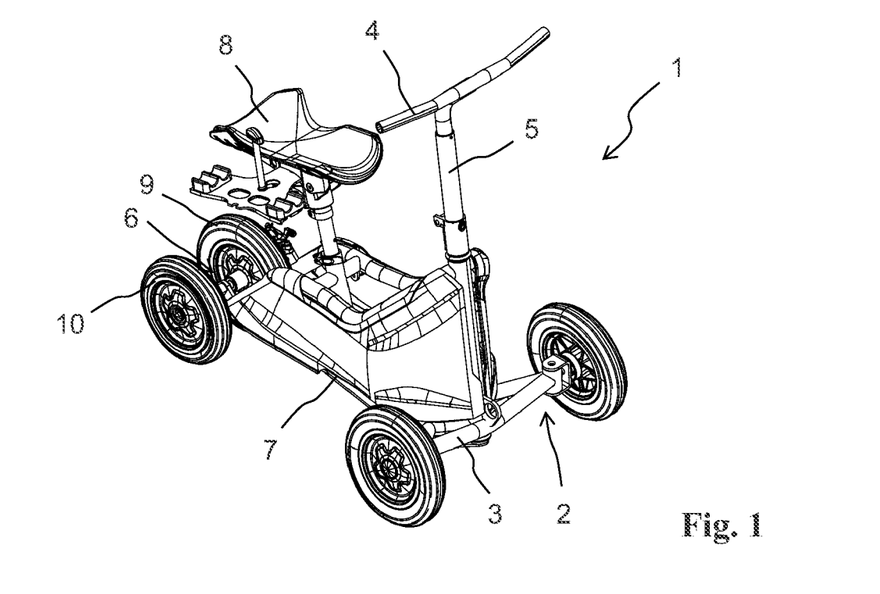
FIG. 1 shows a perspective view of a first embodiment example of the walking aid according to the invention.
Figure 2:
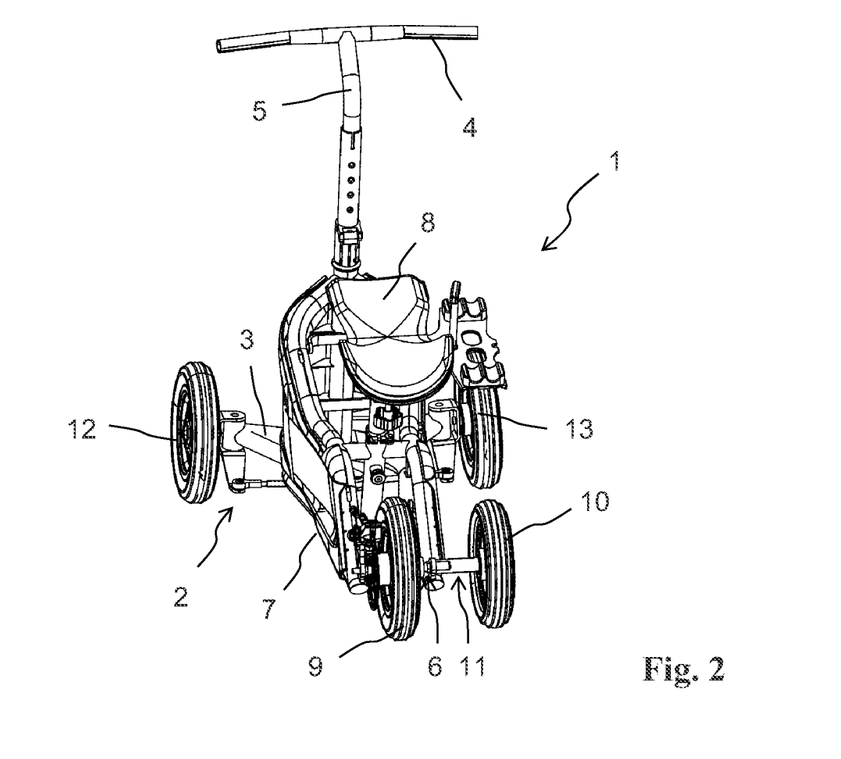
FIG. 2 shows another perspective view of the walking aid of FIG. 1.
Figure 3:
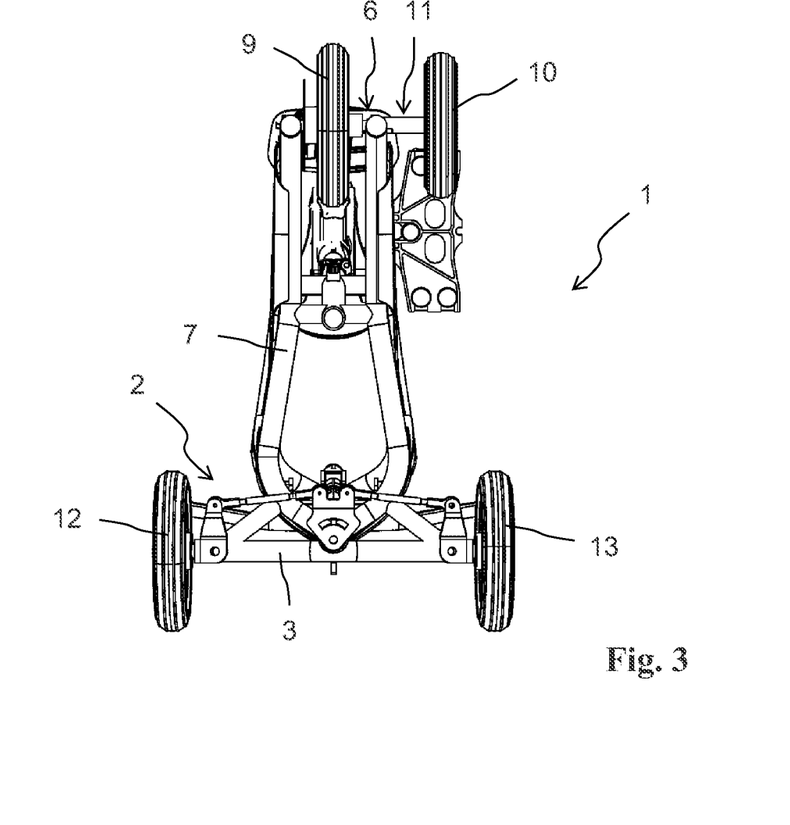
FIG. 3 shows a view of the walking aid of FIG. 1 from the bottom.

The configuration of the walking aid 1 according to the invention depicted in FIGS. 1 to 3 is intended for a user whose right leg requires unloading and whose left leg is intact, since the second wheel 10 is mounted on the right side of the walking aid 1, viewed in the direction of travel, so that it does not interfere with the left leg or left foot during its movement. It is therefore mounted on the right side in order to create additional safety against rightward tipping over of the walking aid 1 together with the user, especially when traveling on a left curve. The hazard of such tipping over would not be ruled out in the embodiment with a single-wheeled rear axle 6, i.e., without the second wheel 10, when the sense of balance of the user is disturbed and/or the left curve is traversed too quickly, and/or the ground is sloped toward the outside of the left curve. In such a situation, the second wheel 10 in the two-wheeled embodiment achieves ground contact and supports the walking aid 1 against the tilting direction.

As required, the second wheel 10 can be mounted on each side of the first wheel 9. For a user whose left leg is to be supported by the walking aid 1 and whose right leg is intact, it would be mounted on the other side of first wheel 9, i.e., the left side, viewed in the travel direction. The smaller diameter of the second wheel 10 is due to the fact that the brake of the walking aid 1 is arranged on the rear axle 6 and acts on the first wheel 9. During normal operation, i.e., except for the hazard situation of tipping over outward just described, only the first wheel 9 should always be on the ground, since the brake of the walking aid 1 only acts on this wheel 9.

Figure 4:
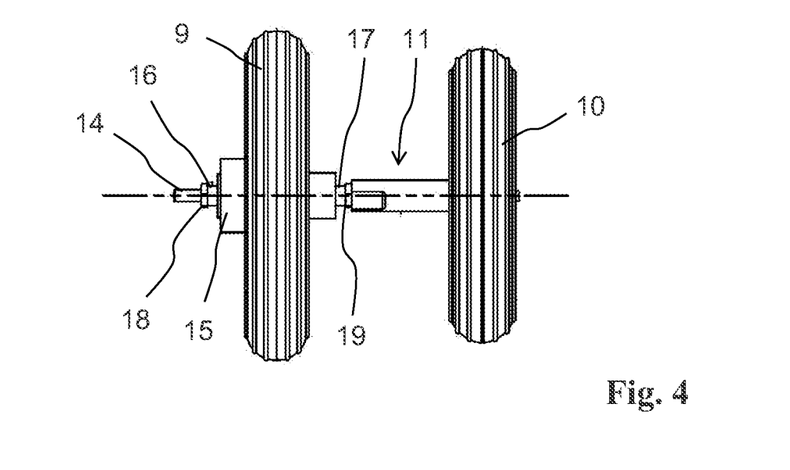
FIG. 4 shows the rear axle of the walking aid of FIG. 1 in the two-wheeled embodiment.
Figure 5:
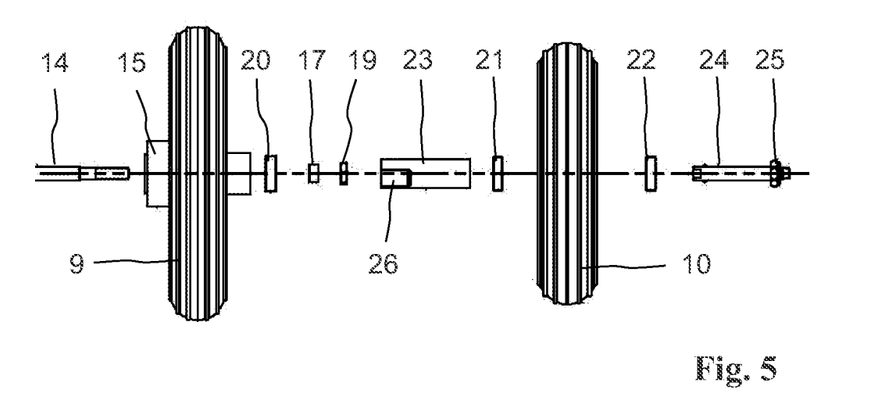
FIG. 5 shows an exploded view of the rear axle of FIG. 4.

Mounting of the axle extension 11 and the second wheel 10 on the axle 14 of the first wheel 9 is shown in FIGS. 4 and 5, in which the mounted state can be seen in FIG. 4 and in an exploded view of the components in FIG. 5. As shown in FIG. 4, the two wheels 9 and 10 in the mounted state of the two-wheeled embodiment are situated in a coaxial position relative to each other. The rim 15 of the first wheel 9 is nonsymmetrical in form, since positioning of a brake disk on the rim 4 is only provided on one side, namely on the left side in FIG. 4. The axle extension 11, when added, is screwed onto threads on the end of axle 14. Otherwise, the rear axle 6 of the walking aid 1 is not altered relative to the single-wheeled embodiment, i.e., none of its components are removed or replaced. The frame 7 of the walking aid 1, not shown in FIG. 4, is supported on the axle 14 on both sides of the first wheel 9 on spacer sleeves 16 and 17 and fastened with nuts 18 and 19, as is known from the fastening of wheels of bicycles onto the frame or front wheel fork. No change relative to the single-wheeled embodiment occurs in this respect by mounting the axle extension 11.

In the exploded view of FIG. 5, apart from the components of the single-wheeled embodiment just mentioned, a roller bearing 20 is additionally seen, which is pressed into the rim 15 to support the rim 15 on axle 14. A further roller bearing of the same type, which cannot be seen in FIG. 5, is situated on the other left side of rim 15 in FIG. 5. In the same manner, two roller bearings 21 and 22 are pressed into the rim of the second wheel 10. The axle extension 11 consists, as is apparent from FIG. 5, of a spacer sleeve 23 and of an additional axle 24, on which the second wheel 10 is mounted to rotate via roller bearings 21 and 22. A nut 25 is screwed onto the outer end of the additional axle 24. The spacer sleeve 23 is screwed onto the threads on the end of the axle 14 of the first wheel 9, for which purpose an open-end wrench is required. The spacer sleeve 23 has appropriate flattenings 26 on its surface for this purpose.

The second wheel 10 can be mounted on the spacer sleeve 23 without using a tool by pushing it onto the additional axle 24 and then introducing it from the outside axially into the spacer sleeve 23 and locking it to it. For this purpose, the additional axle 24 has a locking mechanism, which is schematically simplified in FIG. 6. The additional axle 24 consists of a tube 27 open on one side, into which a pin 28 is guided. The pin projects from the open end of the tube 27, and at the other, closed end of the tube is supported by a spring 29. At a certain axial position, several radial bores are found in which a ball 30 is arranged. The balls 30 are forced radially outward by the pin 28. The diameter of the ball is somewhat greater than that of the bore, so that the ball cannot fall out through it from the tube 27. The pin 28 has recesses 31 at a certain axial position in which the balls 30 can return when the pin 28 is situated in an axial position in which the recesses 31 are opposite the bores with the balls 30. In order to move the pin into this position, an axial force must be exerted on the pin 28 by which means the spring 29 is compressed.

Figure 6:
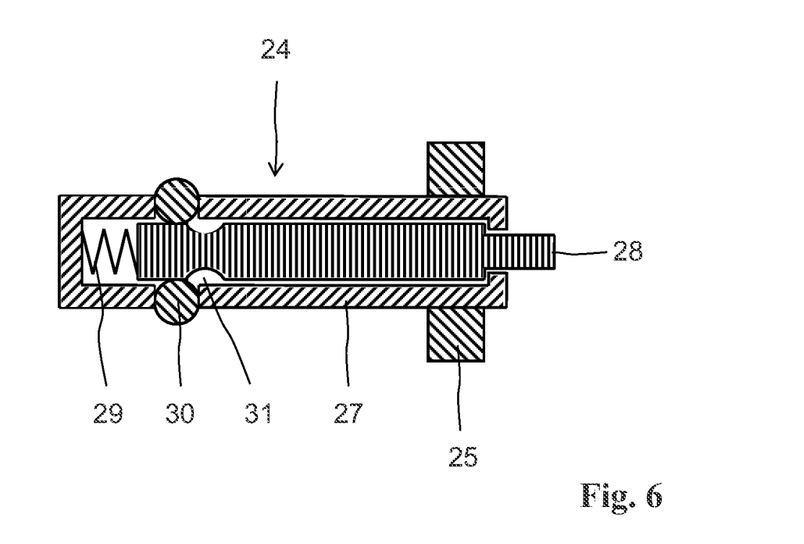
FIG. 6 shows a schematic depiction of a locking mechanism used in the rear axle of FIG. 4.

During mounting of the second wheel 10, the pin 28 is manually forced into tube 27 until the balls 30 withdraw into the recesses 31. The additional axle 24 is then introduced with the second wheel 10 situated on it axially into the spacer sleeve 23 already premounted on the axle 14 until the balls 30 reach an axial position at which the bores are arranged in the spacer sleeve 23 into which the balls 30 enter, when they are forced outward by the pin 28 through the bores in tube 27. The latter is produced by releasing pin 28, so that it is forced outward by spring 29 axially to its stop on the open end of tube 27. The bores in the spacer sleeve 23 are not shown in the figures.

By entry of the balls 30 through the bores in tube 27 of the additional axle 24 in the corresponding bores in the spacer sleeve 23, the additional axle 24 is axially locked with the spacer sleeve 23. This locking can be released by pushing pin 28 with a manually exerted force axially back into the tube 27 far enough so that the balls 30 can return to recesses 31. The additional axle 24 can be pulled from the spacer sleeve 23, and the second wheel 10 disassembled in this way. Using a tool, the spacer sleeve 23 can also be unscrewed from axle 14 and the rear axle 6 returned to the single-wheeled embodiment. As required, the axle extension 11 can also be mounted on the other side of the first wheel 9 in order to prepare the walking aid 1 for use by another person whose left leg is to be supported and for whom stabilization of the rear axle 6 by second wheel 10 is deemed useful or necessary.

In the embodiment example just described, the braking effect during use of the two-wheeled rear axle 6 depends on the weight distribution between the two wheels 9 and 10 of the rear axle 6, since only the first wheel 9 arranged laterally in the center is equipped with a brake, and therefore only this wheel 9 is braked. This can have a negative effect on the braking action, especially during braking on a curve in which the second wheel 10 is situated on the outside of the curve, if during travel through the curve, a significant fraction of the total weight of the user is on the second wheel 10.

Figure 7:
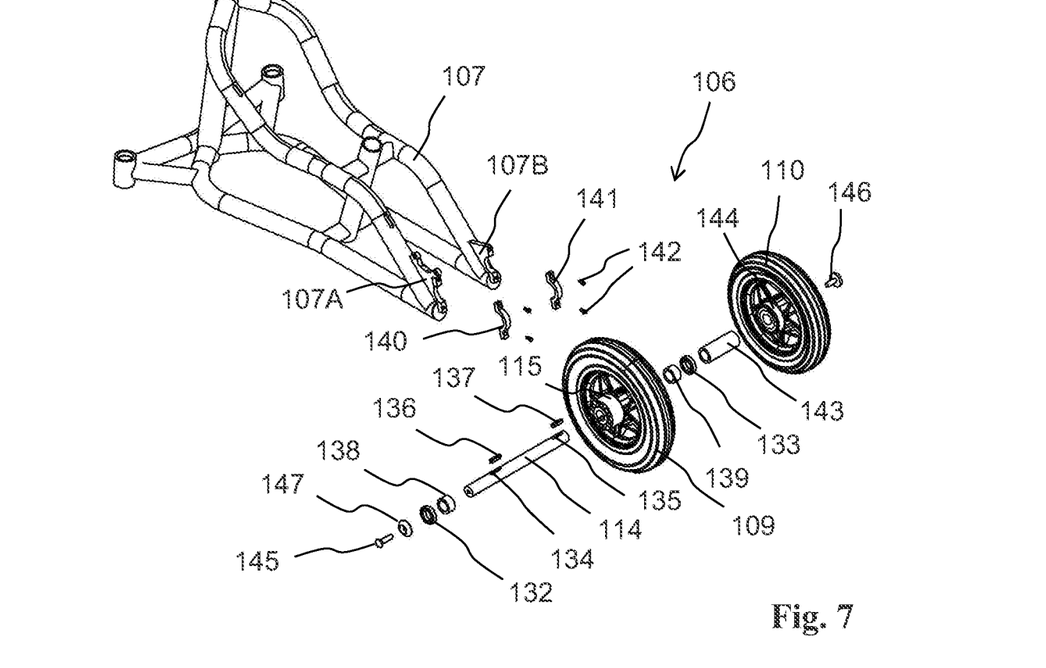
FIG. 7 shows an exploded view of the frame and the two-wheeled rear axle of a second embodiment example of the walking aid according to the invention.

A second embodiment example of the invention in which this problem is eliminated is shown in FIG. 7 in the form of an exploded view of the frame 107 and of the rear part of the undercarriage in the two-wheeled embodiment of the rear axle 106. The other parts of the walking aid 1 are not shown here, since they are identical to those of the first embodiment example depicted in FIGS. 1 to 3. This also applies to the depiction of additional embodiment examples in FIGS. 8 and 9. In the embodiment example of FIG. 7, the two rear wheels 109 and 110 are rigidly connected to each other by a common axle 114, i.e., they cannot rotate relative to it and therefore also not relative to each other. In order for the wheels 109 and 110 to be able to roll on the ground, the common axle 114 in this case is mounted to rotate by means of roller bearings 132 and 133 on the rear end sections 107A and 107B of frame 107.

Two axial grooves 134 and 135 are formed on the outer surface of the common axle 114, into each of which a key 136 or 137, respectively, can be inserted. For assembly of axle 114, the key 136 is initially inserted into the first groove 134. The key 136 serves as dog for the first wheel 109. The first wheel 109 is then pushed onto axle 114 until the key 136 is situated within the rim 115 of the first wheel 109, where it engages in an inside axle groove in rim 115. In this position, most of the axle 114 protrudes from the rim 115 on the right side of the wheel 109 in FIG. 7. Thereafter, onto both sides of rim 115, spacer rings 138 and 139 and then the roller bearings 132 and 133 are pushed onto axle 114 from the left and right. The roller bearings 132 and 133 are fastened with clamps 140 and 141 to the rear end sections 107A and 107B of frame 107. Fastening of the clamps 140 and 141 to the rear end sections 107A and 107B occurs by means of screws 142.

In order to mount the second wheel 110 on axle 114, a spacer sleeve 143 is first pushed onto the section of axle 114 extending beyond rim 115. The second key 137 is then inserted into the axial groove 135 provided for this purpose, and the second wheel 110 is pushed onto axle 114 until the key 137 engages in an inside groove in rim 144 of the second wheel 110. By tightening axial screws 145 and 146 on both ends of axle 114, the arrangement is fixed without play, provided that a cap 147 is previously positioned on the left end of axle 114 to enable free running of roller bearing 132. The spacer sleeve 143 on the opposite side takes on the function of cap 147.

For arrangement of the second wheel 110 on the left rather than the right side of walking aid 1, the common axle 114 is incorporated in a position rotated by 180° relative to the position depicted in FIG. 7, wherein the axle 114 protrudes leftward instead of rightward from the rim 115 of the first wheel 109. Otherwise, installation occurs in the same manner as previously described.

A brake disk is firmly connected to the rim 115 of wheel 109, which cooperates with a brake caliper fastened to the frame 107. These components of the brake of the walking aid 1, identical in all embodiment examples of the invention, are not shown in FIG. 7. In FIG. 2, they are visible there on the left of the first wheel 9. In the second embodiment example, this brake acts as a result of the rigid connection of the two wheels 109 and 110 on the second wheel 110, just as on the first wheel 109, so that a partial weight shifting to the second wheel 110 does not adversely affect the braking action during braking on a curve.

The single-wheeled embodiment of the rear axle 106 differs from the two-wheeled embodiment depicted in FIG. 7 in that the axle 114 for the first wheel 109, present alone in this case, is shorter and has no second groove 135 for a second key 137 and that, instead of spacer sleeve 143, a second end cap 147 is provided. For conversion between the single-wheeled and two-wheeled embodiment of rear axle 106, this must therefore be released from frame 107 and replaced with the other, i.e., longer or shorter, version of axle 114.

Figure 8:
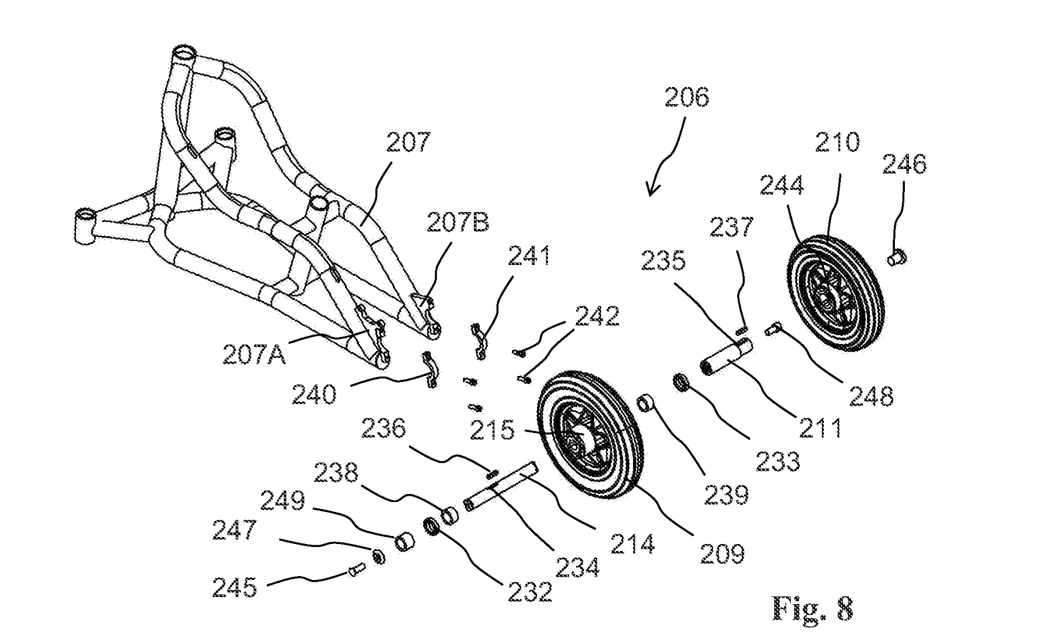
FIG. 8 shows an exploded view of the frame and the two-wheeled rear axle of a third embodiment example of the walking aid according to the invention and FIG. 9 shows an exploded view of the frame and the two-wheeled rear axle of a fourth embodiment example of the walking aid according to the invention.

A third embodiment example of the invention is shown in FIG. 8 in the same depiction as FIG. 7. The essential advantage of the third embodiment example relative to the second embodiment example is that here the second wheel 210 of rear axle 206 is optionally mounted and can again be removed without the axle 214 of the first wheel 209 being loosened from frame 207 and replaced with another one. A further advantage is that new adjustment of the brake of the first wheel 109, which is necessary in the second embodiment example of FIG. 7 during any conversion because of complete replacement of axle 114, drops out.

As is apparent from FIG. 8, in the third embodiment example for mounting of axle 214 of the first wheel 209 on frame 207, the same components in the same arrangement are used as in the second embodiment example of FIG. 7. These components and their installation are therefore not described again here. Components of the same design and function are denoted in FIG. 8 by reference numbers that are larger by 100 than the reference numbers of the corresponding components in FIG. 7.

The axle 214 of the first wheel 209 has on its outer surface only a single axial groove 234 for a key 236. The latter also serves here for rotationally fixed connection of the axle 214 with the rim 215 of the first wheel 209. If the key 236 is situated within rim 215, where it engages in an inside axial groove in rim 215, and the axle 214 is mounted on frame 207, the axle 214 protrudes on both sides equally far beyond the rear end sections 207A and 207B of frame 207. This protrusion is much smaller than the distance between the two rear wheels 209 and 210 in the mounted state of the two-wheeled embodiment.

For use of the walking aid 1 with only one rear wheel 209, a spacer ring 238 is pushed onto the right side of axle 214 in FIG. 8, after which only an additional spacer ring 249 is pushed on, as well as a roller bearing 233 on the left side, an end cap 247 is attached, and a screw 245 tightened, i.e., the axial sequence of components in this case is a mirror image of the left side.

For conversion to the two-wheeled embodiment with a second wheel 210 on the right side in the direction of travel the screw 245, the end cap 247 and the spacer ring 249 are removed from axle 214 of the first wheel 209 there, i.e., on the right side in FIG. 8. Instead of spacer ring 249, an axle extension 211 is positioned. For this purpose, this has a bore in its end surface facing the first wheel 209, whose inside diameter corresponds to the outside diameter of axle 214. At the base of this bore, the axle extension 211 has a groove, not visible in FIG. 7, in the radial direction. For this purpose, the axle 214 has matching integral protrusions on both ends that have a similar shape as the keys 236 and fit into the groove on the base of the bore of the axle extension 211, so that by joining the axle extension 211 with axle 214 a tongue-and-groove connection is produced that ensures a rotationally fixed connection of the axle extension 211 with axle 214. By means of axial overlap between axle 214 and axle extension 211, a sufficient bending rigidity of the combination of these two components is achieved.

The axle extension 211 is then fastened to axle 214 without play by means of a screw 248 that passes axially through the axle extension 211. The head of screw 248 in its tightened state is countersunk in a bore formed on the end of axle extension 211. A key 237 is then inserted into an axial groove 235 on the outer surface of the axle extension 211, and the second wheel 210 is pushed onto the axle extension 211 until the key 237 engages in the inside axial groove in rim 244 of the second wheel 210. The second wheel 210 is thereby connected in rotationally fixed fashion to the axle extension 211. Finally, the second wheel 210 is fixed by means of a screw 246 in the axial direction on axle extension 211, for which purpose the bore in the end surface of axle extension 211, in which the head of the screw 248 is countersunk, has threads matching screw 246. The outer screw 246 could also be replaced with a toolless type of fastening.

As a result, through the installation process just described, the axle 214 of the first wheel 209 is lengthened by the axle extension 211 and supplemented by a second wheel 210, which is rigidly fastened by two tongue-and-groove connections to the first wheel 209 on which the brake of axle 214 is fastened. This brake therefore acts independently of the weight distribution between wheels 209 and 210 equally on both wheels 209 and 210.

In order to lengthen the axle 214 of the first wheel 209 also on the other side and supplement it with a second wheel 210, the axle 214 also has a radially extending protrusion on the other left end surface in FIG. 8 in the form of a key, as well as axial threads. The axle extension 211 can therefore be mounted as required on the other end of axle 214 in the same manner, without disassembly of axle 214 from frame 207 being necessary.

Figure 9:
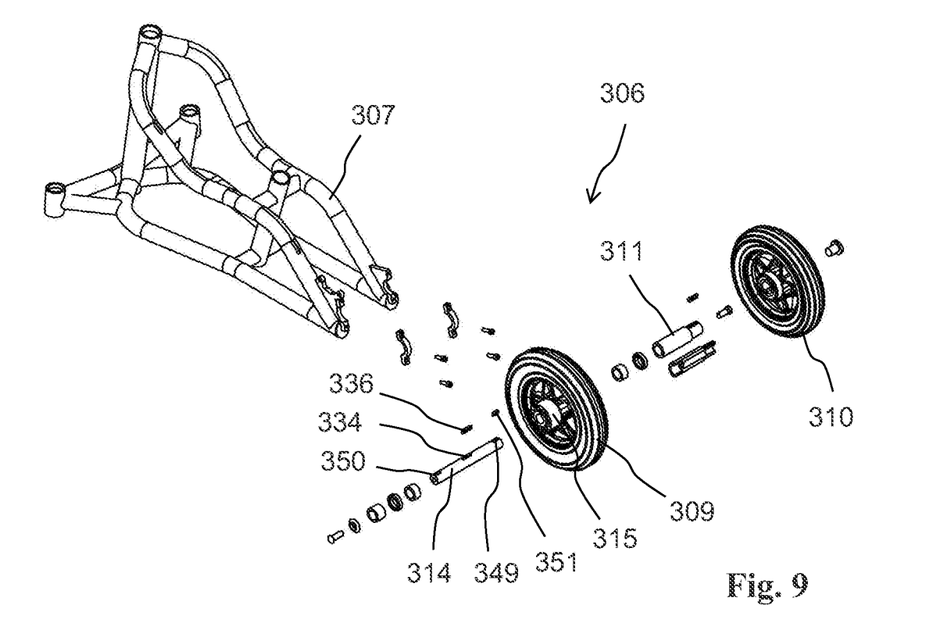

A fourth embodiment example of the invention is shown in FIG. 9. This fourth embodiment example largely agrees with the third embodiment example and differs from it only in the configuration of the rotationally fixed connection between axle 314 of the first wheel 309 and the axle extension 311. Corresponding components are therefore not described again here. Components of the same design and function are denoted in FIG. 8 with reference numbers that are larger by 100 than the reference numbers of the corresponding components in FIG. 8.

As is apparent from FIG. 9, the axle 314 of the first wheel 309, just like that of the third embodiment example, has an axial groove 334 on the outer surface for a key 336 for rotationally fixed connection with the rim 315 of the first wheel 309. To produce a rotationally fixed connection between the axle 314 and the axle extension 311, the axle 314, instead of radial protrusions on the two end surfaces, has two additional axial grooves here, 349 and 350, on its outer surface close to its two axial ends, which are suitable for optional accommodation of a second key 351. Accordingly, the axle extension 311, which is shown in FIG. 9 both in the exploded view and beneath it in a cutaway view, on the inside of the front bore by means of which it can be mounted axially on axle 314, has an axial groove not visible in FIG. 9, into which the key 351 inserted into groove 349 or 350 of axle 314 engages during mounting of the axle extension 311 onto axle 314.

The rotationally rigid fixation of the second wheel 310 on an axle extension 311 occurs precisely as in the third embodiment. The fourth embodiment therefore differs from the third only in the type of tongue-and-groove connection between the axle 314 of the first wheel 309 and the axle extension 311, which is arranged here axially, instead of radially aligned, and on the outer surface of axle 314, instead of on its end surface. For optional mounting of the axle extension 311 on both ends of axle 314, a groove 349 or 350 is provided, as well as axial threads. The axle extension 311 can therefore be mounted as required on both ends of axle 314 in the same manner without having to disassemble it from frame 307.

It should be noted concerning the embodiments with rotationally fixed connection of the two rear wheels in the two-wheeled embodiment of the rear axle that slipping on at least one wheel of the rear axle necessarily occurs here during travel on a curve. This slipping, however, is not serious, since the spacing of the rear wheels is much less than that of the front wheels, which are mounted individually to rotate and to be steered on the front axle. The advantage of a more reliable braking effect outweighs the drawback of a slight slip of the rear wheels during travel on a curve.

The invention claimed is:

1. A mobile walking aid comprising an undercarriage, a frame and a support for a person's leg, the undercarriage having a two-wheeled front axle and a rear axle, wherein the rear axle is convertible between a single-wheeled embodiment with a first wheel and a two-wheeled embodiment with the first wheel and a second wheel and wherein the mobile walking aid further comprises a conversion kit for conversion from the single-wheeled into the two-wheeled embodiment, the conversion kit comprising the second wheel and a common axle for the first and second wheels, the common axle being longer than the rear axle and mountable on the frame in two different positions in which the first wheel is arranged at the same location as in the single-wheeled embodiment and the second wheel is arranged laterally offset to the left or right from the first wheel.

2. The mobile walking aid of claim 1, wherein the second wheel is smaller in diameter than the first wheel.

3. The mobile walking aid of claim 1, wherein the second wheel in the two-wheeled embodiment of the rear axle has a spacing from the first wheel that is at least one-sixth of a spacing between the two wheels of the front axle.

4. The mobile walking aid of claim 1, wherein the second wheel in the two-wheeled embodiment of the rear axle has a spacing from the first wheel that is at most one-third of a spacing between the two wheels of the front axle.

5. The mobile walking aid of claim 1, wherein in both the single-wheeled embodiment and the two-wheeled embodiment, the first wheel of the rear axle is arranged laterally in the center between the two front wheels.

6. The mobile walking aid of claim 1, wherein the rear axle is rotatably mounted on the frame and in the two-wheeled embodiment the first and second wheels are joined to each other in a rotationally fixed fashion.

7. The mobile walking aid of claim 1, wherein both in the single-wheeled embodiment and in the two-wheeled embodiment of the rear axle only a single brake is provided, which engages on the first wheel of the rear axle.

8. A conversion kit for conversion of the walking aid of claim 1 from the single-wheeled into the two-wheeled embodiment, wherein the conversion kit comprises the second wheel and a common axle for the first wheel of the walking aid and the second wheel, wherein the common axle is longer than that the rear axle and is mountable in two different positions on the frame of the walking aid, and wherein the first wheel is arranged at the same location as in the single-wheeled embodiment and the second wheel is arranged offset to the left or right laterally from the first wheel.

9. The A mobile walking aid comprising an undercarriage, a frame and a support for a person's leg, the undercarriage having a two-wheeled front axle and a rear axle, wherein the rear axle is convertible between a single-wheeled embodiment with a first wheel and a two-wheeled embodiment with the first wheel and a second wheel, further comprising a conversion kit for conversion from the single-wheeled into the two-wheeled embodiment, the conversion kit comprising an axle extension mountable on an axle of the first wheel and the second wheel.

10. The mobile walking aid of claim 9, wherein the axle extension mountable on either a first or second side of the axle of the first wheel.

11. The mobile walking aid of claim 9, wherein the axle extension in a mounted state extends coaxially to the axle of the first wheel.

12. The mobile walking aid of claim 9, wherein the second wheel is smaller in diameter than the first wheel.

13. The mobile walking aid of claim 9, wherein the second wheel is mountable onto and demountable from the axle extension by a snap-on connection without using a tool.

14. The mobile walking aid of claim 9, wherein the axle extension has a spacer sleeve that is screwable onto the axle of the first wheel and an additional axle that is lockable to the spacer sleeve, on which the second wheel is mounted.

15. The mobile walking aid of claim 9, wherein an axle of the first wheel is rotatably mounted on the frame and the first wheel is connected to the axle in a rotationally fixed fashion, and wherein for conversion to the two-wheeled embodiment, an axle extension is connectable to the axle of the first wheel in a rotationally fixed fashion, and the second wheel is connectable to the axle extension in a rotationally fixed fashion.

16. A conversion kit for conversion of the walking aid of claim 9 from the single-wheeled into the two-wheeled embodiment, wherein the conversion kit comprises an axle extension mountable on an axle of the first wheel and the second wheel rotatably mounted thereon.

17. The mobile walking aid of claim 9, wherein the second wheel in the two-wheeled embodiment of the rear axle has a spacing from the first wheel that is at least one-sixth of a spacing between the two wheels of the front axle.

18. The mobile walking aid of claim 9, wherein the second wheel in the two-wheeled embodiment of the rear axle has a spacing from the first wheel that is at most one-third of a spacing between the two wheels of the front axle.

19. The mobile walking aid of claim 9, wherein in both the single-wheeled embodiment and the two-wheeled embodiment, the first wheel of the rear axle is arranged laterally in the center between the two front wheels.

20. The mobile walking aid of claim 9, wherein the rear axle is rotatably mounted on the frame and in the two-wheeled embodiment the first and second wheels are joined to each other in a rotationally fixed fashion.

21. The mobile walking aid of claim 9, wherein both in the single-wheeled embodiment and in the two-wheeled embodiment of the rear axle only a single brake is provided, which engages on the first wheel of the rear axle.

* * * * *